United States Patent [19]
Ancel, deceased et al.

[11] Patent Number: 5,388,947
[45] Date of Patent: Feb. 14, 1995

[54] MANUALLY CONTROLLED VEHICLE RESTRAINT APPARATUS WITH A COUNTERBALANCE

[76] Inventors: John F. Ancel, deceased, late of St. Louis, Mo.; by Colette Ancel, legal representative, 773 Buckley Rd., St. Louis, Mo. 63125

[21] Appl. No.: 86,305

[22] Filed: Jul. 6, 1993

[51] Int. Cl.⁶ ............................ B65G 9/00; E01D 1/00; B66B 17/12
[52] U.S. Cl. .................................. 414/401; 14/71.1; 187/404
[58] Field of Search ............... 414/401, 373, 402, 352, 414/580, 584, 396; 14/71.1, 69.5, 71.3, 71.5; 187/15, 94–95; 280/490.1, 504

[56] References Cited

U.S. PATENT DOCUMENTS

| | | | |
|---|---|---|---|
| 473,036 | 4/1882 | Veenschoten | 187/15 |
| 3,596,303 | 8/1971 | Kelley | 14/71.1 |
| 4,373,847 | 2/1983 | Hipp et al. | 414/401 |
| 4,443,150 | 4/1984 | Hahn et al. | 414/401 |
| 4,553,895 | 11/1985 | Ellis | 414/401 |
| 4,605,353 | 8/1986 | Hahn et al. | 414/401 |
| 4,728,242 | 3/1988 | Erlandsson | 414/401 |
| 4,815,918 | 3/1989 | Bennett et al. | 414/401 |
| 4,818,170 | 4/1989 | Fisher et al. | 414/401 |

*Primary Examiner*—David A. Bucci
*Assistant Examiner*—R. B. Johnson
*Attorney, Agent, or Firm*—Herzog, Crebs & McGhee

[57] ABSTRACT

The mechanical vehicle restraining device of the present invention secures a truck or other parked vehicle to a loading dock by locking onto the vehicle ICC bar thereby securing the vehicle. The device includes a base mounting plate mounted on the face of the loading dock wall and a hook positioned to move vertically within a frame guide attached to the base mounting plate. A counterbalance weight is positioned to move vertically within a second frame guide adjacent to the hook frame guide. The hook and the counterbalance weight are connected by a flexible cable. By manually depressing the hook, the hook moves down and the counterbalance weight moves up to engage a latching device. When the latching device is released, the counterbalance weight moves down thereby raising the hook until the hook engages the ICC bar.

12 Claims, 2 Drawing Sheets

MANUALLY CONTROLLED VEHICLE RESTRAINT APPARATUS WITH A COUNTERBALANCE

FIELD OF THE INVENTION

This invention relates to vehicle restraint devices, and more particularly to vehicle restraint devices used while a vehicle is parked adjacent to a loading dock. The device prevents movement of the vehicle trailer during loading and unloading due to shifting of the load.

BACKGROUND OF THE INVENTION

The present invention is a device which secures trucks and other vehicles to a loading dock during loading and unloading, or during overnight stays. As professionals working with such vehicles understand, chocking the wheels is simply not enough to prevent serious loading and unloading accidents, ice slide casualties, or trailer draft. The restraining device of the present invention prevents the vehicle from creeping, thereby making the vehicle and dock one stable platform. The present invention is a simple mechanical device, which reduces operator confusion during operation, maintenance, and repair.

Many truck restraints have been developed to lock and secure the ICC bar of a truck or other vehicle to a dock wall. These restraints may be divided into two basic groups, powered and non-powered. The powered restraints are generally run by electricity or hydraulics. The non-powered restraints are generally controlled manually. Within the patent literature, such mechanical devices are represented by U.S. Pat. No. 5,026,242 (Alexander).

U.S. Pat. No. 5,026,242 teaches a device that is actuated when the vehicle ICC bar moves an arm of the restraint. Using a cam follower and a spring system, a restraining member is raised using the motion of the arm to transfer energy thereby raising the restraint. Such an arrangement has a serious disadvantage. Weakening of the spring will affect operation of the device. Also, the arm engaging the ICC bar must be relatively long to accommodate variations in truck height.

Electrical and hydraulic devices are represented in U.S. Pat. No. 4,488,325 (Bennett, et al.), U.S. Pat. No. 4,664,582 (Edmeads), U.S. Pat. No. 4,767,254 (Kovach, et al.), U.S. Pat. No. 4,784,567 (Hageman, et al.), U.S. Pat. No. 4,887,954 (Gregerson, et al.), U.S. Pat. No. 4,915,568 (West) and U.S. Pat. No. 5,071,306 (Alexander).

U.S. Pat. No. 4,488,325 (Bennett, et al.) teaches a device in which a frame is mounted on the front surface of a dock beneath a pit which houses an adjustable dockboard. To raise or lower the slide assembly, a motor, mounted on the slide assembly, drives a gear that engages a rack carried by the frame. Unfortunately, the motor may be inoperable if electricity is not available, thereby causing the device to fail.

The Edmeads device of U.S. Pat. No. 4,664,582 includes a drive cylinder that is attached to a base plate and a carriage plate and effects longitudinal travel of the carriage plate. Here, the hook will disengage if there is a failure of hydraulic pressure.

The device of U.S. Pat. No. 4,767,254 (Kovach) includes a restraining member which is biased upwardly to an operative position. A power operated unit is arranged to move the restraining member downwardly from the operative position to a storage position where it is locked by a releasable latch. The disadvantage of the Kovach device is that the restraining member may be inoperable if electricity is unavailable.

U.S. Pat. No. 4,784,567 (Hageman, et al.) teaches a device which encompasses a hook that is moved between an operative and an inoperative position by a fluid cylinder assembly. The cylinder herein is disposed in a recess in the driveway adjacent to the loading dock. The piston rod of the fluid cylinder assembly is connected to the hook. A disadvantage of this device is that the hook will disengage if there is a failure of hydraulic pressure.

The Gregerson device of U.S. Pat. No. 4,887,954 teaches a sector assembly which is mounted within a frame and rotates about a substantially horizontal axis. An actuator connected to the frame and sector assembly rotates the sector assembly in a first rotational direction to a restraint position in which the vehicle is locked to the adjacent structure. The assembly rotates in an opposite rotational direction to a release position in which the vehicle is released. The disadvantage of this device lies in the fact that the hook will be inoperable if the pneumatic lines freeze due to moisture.

The truck restraining apparatus of U.S. Pat. No. 4,915,568 (West) has a vertically extending jackscrew to which a follower nut is mounted. The jackscrew passes through a bore in a restraining member and is held in position by brackets on a mounting plate. Means, such as an electric motor, are provided for rotation of the jackscrew. Unfortunately, the motor and device may be inoperable if electricity is unavailable.

In the Alexander device of U.S. Pat. No. 5,071,306, all loading on the restraining device is transmitted to the frame while the device is in the vehicle restraining position since there is no force component on the actuator. A pair of switches may be used to determine whether the actuating member is either in its fully extended vehicle restraining position. As will be understood, the device will become inoperable if power is unavailable.

Accordingly, it is the general object of the present invention to provide a vehicle restraining device which requires no outside source of power. A further object of the invention is to provide a simple mechanical vehicle restraining device which can be easily installed. Yet another object of the invention is to provide a vehicle restraining device which will be simple to maintain. Other objects and features will be in part apparent and in part pointed out hereinafter.

SUMMARY OF THE INVENTION

The present invention is a mechanical vehicle restraint device comprising two sets of vertical guides affixed to the front face of a mounting plate. Located inside the first vertical guide is a hook. The hook is free to move up and down in the vertical guide between a raised, restraining position and a lowered, non-restraining position. Located within the second vertical guide is a counterbalance weight. This weight also is free to move up and down within its vertical guide.

Attached to the top of the hook is a first end of a cable; a second end of the cable is attached to the top of the weight. In use, the cable rises from the hook vertically to near the top of the mounting plate where it passes over a guide. It is then directed horizontally until it passes over a second guide. It is thereafter directed downwardly to the counterbalance weight.

The hook is moved vertically in a downward direction to the disengaging position by means of an activating rod. To effect this downward movement, the activating rod is inserted in a a first aperture in the top of the device and manually depressed. As the hook moves downward within the first vertical guide, the cable attached to the hook causes the counterbalance weight to rise within the second vertical guide. When the hook reaches the lowered, non-restraint position, the counterbalance weight engages a latching mechanism which supports the weight in the raised position.

At this point, the hook is ready to engage a truck or other vehicle. When the vehicle is properly positioned at the dock, the activating rod is inserted in a second aperture. Downward pressure on the rod releases the latching mechanism which has been maintaining the counterbalance weight in the raised position. This allows the weight to move downwardly in the second vertical guide, which in turn causes the hook to rise within the first vertical guide until it engages the ICC bar or other similar member on the vehicle. The weight of the counterbalance weight is sufficient to positively raise the hook to the raised, restraining position. To lower and disengage the hook from the ICC bar, the hook is depressed as described above until the counterbalance weight is released by the latching mechanism.

As will be understood, the problems normally encountered during repair and maintenance, line "freeze up", electrical shorts, fluid levels and pressure, and fitting leaks are eliminated with the instant device. In addition, the mechanical vehicle restraint locking device of the present invention requires minimal maintenance and is easy and quick to install. Similarly, dangers normally associated with electrical or hydraulic assemblies, such as electrical shocks, dangerous power movements, unsafe power movements due to malfunctions sometimes associated with installation and use of the product, and the like, are eliminated. Lastly, the raising of the hook of the instant device is done by the counterbalance weight. Since this is a preselected force, the possibility of mechanical damage to the frame structure or components is significantly reduced should the hook hit an obstruction.

DETAILED DESCRIPTION OF THE DRAWINGS

Figure 1:
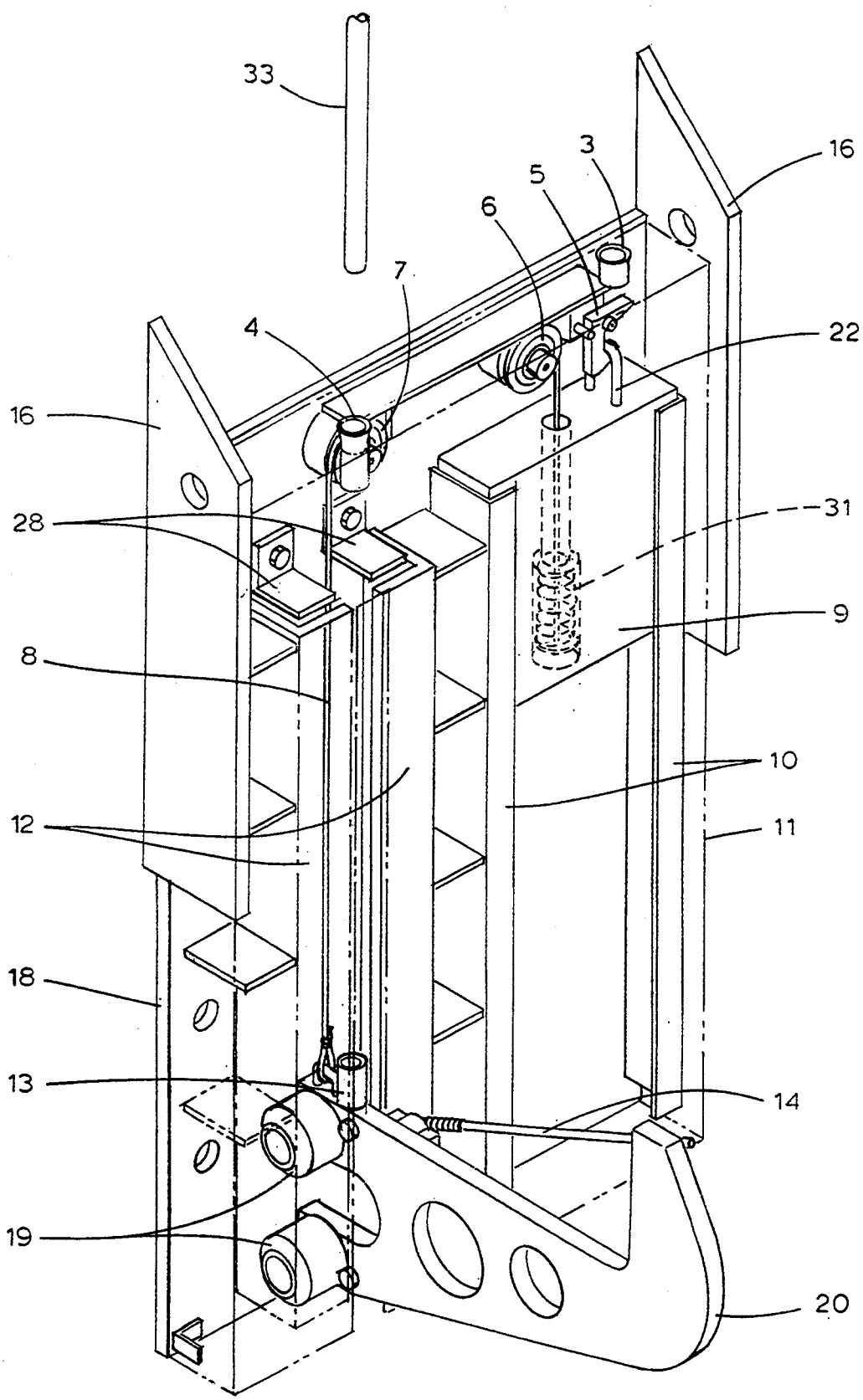
FIG. 1 is a perspective view of the mechanical vehicle restraint locking device of the present invention with the hook assembly in the lowered, non-restraint position.
Figure 2:
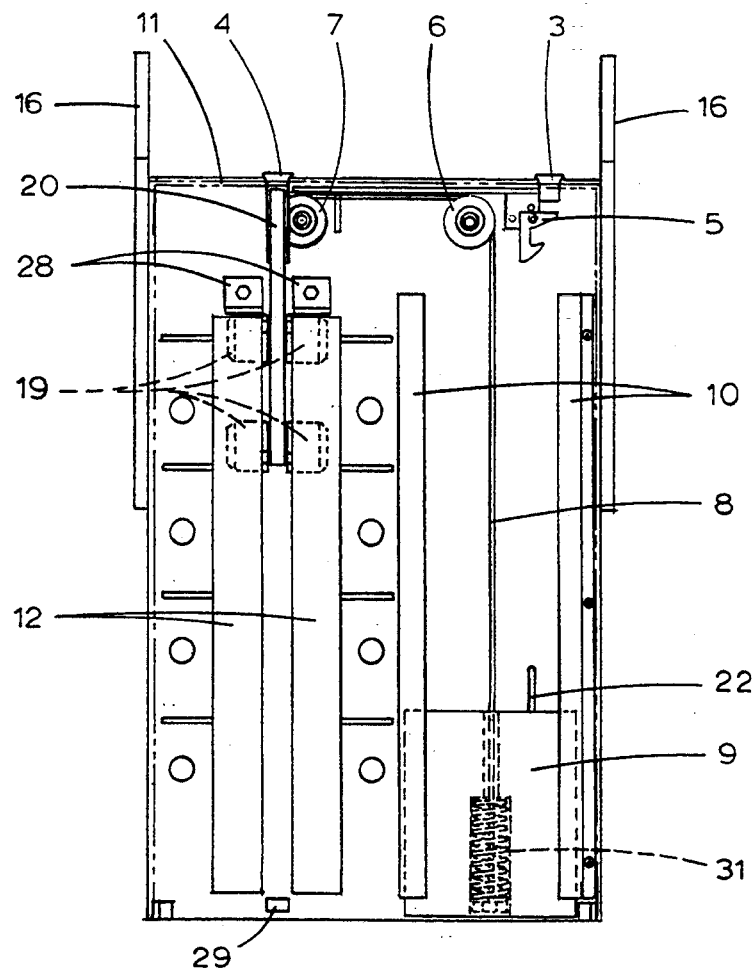
FIG. 2 is a frontal view of the mechanical vehicle restraint locking device of the present invention with the hook assembly in the raised, restraint position.
Figure 3:
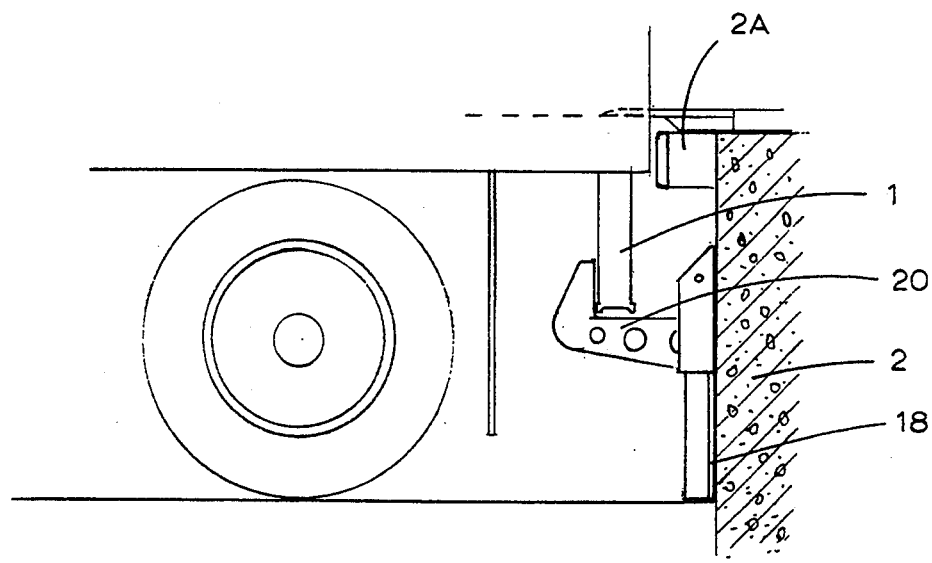
FIG. 3 is an elevational view from the right side of the mechanical restraint locking device showing the hook raised and in engagement with the ICC bar on a truck.

Referring now to the drawings wherein like reference characters represent like elements, FIGS. 1 through 3 illustrate one embodiment of the device of the present invention.

The device of the present invention secures a vehicle having an ICC bar 1 attached to the rear of the vehicle to a loading dock 2. To use the device, the vehicle backs to the dock for the purpose of loading or unloading. When properly positioned, the rear of the vehicle may abut a dock bumper 2A.

A base mounting frame 18 is fastened to a vertical face of dock 2 by means of bolts (not shown) or other conventional means of attachment. The means of attachment are selected from conventional devices which will insure that frame 18 will withstand any foreseeable force tending to separate frame 18 from the dock face.

Base mounting frame 18 is provided with side members 16 and a cover 11 (shown in phantom). Frame 18 is further provided with counterweight guides 10, which provide a vertical guide for counterweight 9, and hook guides 12, which provide a vertical guide for hook 20.

The top surface of cover 11 is provided with two guide apertures 3 and 4, respectively. Aperture 3 is aligned with a latch mechanism 5. Aperture 4 is aligned with a cup 13 mounted on the top surface of hook 20. To lower hook 20, rod 33 is inserted in and passed through aperture 4 to engage cup 13, which serves to maintain its vertical alignment of rod 33 with hook 20. Downward pressure on activating rod 33 will cause hook 20 to move down. At its lowest position, hook 20 will encounter lower hook stop 29. When hook 20 is in this lowered position, a vehicle may be backed up to the dock. Hook 20 is guided by hook rollers 19, which are mounted on hook 20 and engage hook guides 12. A cable 8 is fastened to the top of hook 20. Cable 8 passes over the top of cable guide 6 and 7 and is attached to counterbalance weight 9. If desired, the attachment to counterbalance weight 9 may incorporate a spring 31 to reduce shock load.

As hook 20 is depressed to the lowered position, cable 8 will cause counterbalance weight 9 to move upward within counterweight guides 10. As counterbalance weight 9 reaches the top of counterweight guides 10, a weight hook 22, located on the top surface of counterbalance weight 9, will engage latch 5 thereby holding counterbalance weight 9 in the raised position. When counterbalance weight 9 is held in this raised position by latch 5, hook 20 will be in its lowered position. To activate the vehicle restraint device, rod 33 is inserted in aperture 3 to engage latch 5. Downward movement of rod 33 will cause latch 5 to disengage from weight hook 22. Releasing the latch 5 from the weight hook 22 will permit counterbalance weight 9 to move downward in counterweight guides 10. As counterbalance weight 9 moves downwardly, cable 8 will pass through cable guides 6 and 7 and cause hook 20 to move upwardly until it engages ICC bar 1 of the vehicle or is stopped by upper hook stops 28.

If desired, hook 20 may be provided with a sensing device 14. As hook 20 engages ICC bar 1 on the vehicle, sensing device 14 will be activated which in turn will activate a conventional signalling device (not shown) to assure both the driver and the dock operator that the restraining device is engaged with the vehicle ICC bar.

It should be noted that the foregoing drawings and accompanying description is intended to be exemplary of a preferred embodiment of the invention.

In view of the above, it will be seen that the several objects of the invention are achieved and other advantageous results are obtained. As various changes could be made in the above product without departing from the scope of the invention, it is intended that all matter contained in the above description or shown in the accompanying drawings shall be interpreted as illustrative and not in a limiting sense.

What is claimed is:

1. An apparatus for restraining a vehicle parked on a surface adjacent to a loading dock with an upper surface, the vehicle having a complementary restraining means attached thereto, said apparatus comprising:
   a mounting frame;
   vertical guide means fixed to said mounting frame;
   vehicle restraining means engageable with said complementary restraining means for holding the vehicle in the parked position;
   counterbalance weight means for moving said vehicle restraining means in a vertical direction;
   latching means attached to said mounting frame for retaining said counterbalance weight means in a selected position;
   said mounting frame being adapted to be mounted to said loading dock in a vertical position between said upper surface of said dock and said surface upon which the vehicle is parked;
   said vertical guide means including a first pair of vertical guide means designed to slidably mate with said vehicle restraining means, and a second pair of vertical guide means designed to slidably mate with said counterbalance weight means;
   said vehicle restraining means being adapted to be vertically moveable in said first pair of vertical guide means between a vehicle restraining raised position and a vehicle non-restraining lowered position, said vehicle restraining means including means projecting perpendicularly from said mounting frame and operative to engage said complementary restraining means when said vehicle restraining means is in said raised position;
   said counterbalance weight means being adapted to move vertically in said second pair of vertical guide means between a non-latched lowermost position and a latched uppermost position;
   a mechanical connection that connects said vehicle restraining means and said counterbalance weight means such that vertical movement of said vehicle restraining means in a first vertical direction will produce a movement of said counterbalance weight means in a second vertical direction opposite to said first vertical direction, whereby when said counterbalance weight means is in its uppermost position said vehicle restraining means will be in its lowered position;
   said latching means being operative in response to the movement of said counterbalance weight means to its uppermost position, to engage and retain said counterbalance weight means at said uppermost position; and
   manual operated means selectively operable at a first location on said mounting frame to manually move said vehicle restraining means from its raised position to its lowered position which causes said counterbalance weight means to be raised to its uppermost position for engagement with said latching means, said manual operated means being selectively operable at a second location on said mounting frame to engage said latching means to release said counterbalance weight means thereby permitting said counterbalance weight means to move to its lowermost position with the resulting effect that the vehicle restraining means is moved to its raised position thereby engaging said complementary restraining means on the parked vehicle whereby said parked vehicle is restrained from moving from said loading dock.

2. An apparatus according to claim 1 wherein said vehicle restraining means is a hook adapted to engage said complementary restraining means on the vehicle.

3. An apparatus according to claim 2 wherein said complementary restraining means is a substantially horizontal member rigidly attached to the vehicle and commonly referred to as the "ICC" bar.

4. An apparatus according to claim 1 wherein the mechanical connection between said vehicle restraining means and said counterbalance weight means is a flexible cable.

5. An apparatus according to claim 4 including one or more cable guides, wherein said flexible cable is guided over said one or more cable guides which translate the vertical motion of said vehicle restraining means into vertical motion of the counterbalance weight means in the opposite direction.

6. An apparatus according to claim 5 wherein said one or more cable guides and flexible cable are constructed to minimize resistance to movement of said vehicle restraining means and said counterbalance weight means.

7. An apparatus according to claim 6 wherein said cable guides are rollers constructed to engage said flexible cable.

8. An apparatus according to claim 1 wherein said vehicle restraining means is constructed with means to minimize the friction between said vehicle restraining means and said first vertical guide means.

9. An apparatus according to claim 1 wherein said vehicle restraining means is constructed with rollers which engage said first pair of vertical guide means.

10. An apparatus according to claim 1 wherein said manual operated means to move said vehicle restraining means to its lowermost position comprises an elongated device which is used to engage said vehicle restraining means and to manually force said vehicle restraining means to its lowermost position.

11. An apparatus according to claim 1 wherein a sensing device is provided on said vehicle restraining means to provide a signal when said vehicle restraining means is engaged with said complementary means on the vehicle.

12. An apparatus according to claim 11 wherein said sensing device is adapted to be activated when said vehicle restraining means engages said complementary restraining means on said vehicle.

* * * * *